United States Patent
Jha et al.

(10) Patent No.: US 10,977,086 B2
(45) Date of Patent: Apr. 13, 2021

(54) WORKLOAD PLACEMENT AND BALANCING WITHIN A CONTAINERIZED INFRASTRUCTURE

(71) Applicant: VMWARE, INC., Palo Alto, CA (US)

(72) Inventors: Chandrashekhar Jha, Bangalore (IN); Yash Bhatnagar, Bangalore (IN); Amit Kumar, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 68 days.

(21) Appl. No.: 16/271,906

(22) Filed: Feb. 11, 2019

(65) Prior Publication Data

US 2020/0151018 A1  May 14, 2020

(30) Foreign Application Priority Data

Nov. 14, 2018 (IN) ............................. 201841042821

(51) Int. Cl.
*G06F 9/50* (2006.01)
*G06F 9/48* (2006.01)

(52) U.S. Cl.
CPC .......... *G06F 9/5044* (2013.01); *G06F 9/4856* (2013.01); *G06F 9/5088* (2013.01); *G06F 2209/505* (2013.01)

(58) Field of Classification Search
None
See application file for complete search history.

(56) References Cited

U.S. PATENT DOCUMENTS

| | | | |
|---|---|---|---|
| 9,760,400 B1* | 9/2017 | Emelyanov | G06F 9/4856 |
| 2013/0238804 A1* | 9/2013 | Tanino | G06F 9/4856 709/226 |
| 2013/0326507 A1* | 12/2013 | McGrath | G06F 9/4856 718/1 |
| 2014/0164554 A1* | 6/2014 | Joshi | G06F 9/4856 709/217 |
| 2015/0058863 A1* | 2/2015 | Karamanolis | G06F 9/5083 718/105 |
| 2016/0378563 A1* | 12/2016 | Gaurav | G06F 9/5077 718/1 |
| 2017/0031698 A1* | 2/2017 | Mathews | G06F 9/45558 |
| 2017/0126506 A1* | 5/2017 | Padala | H04L 43/08 |
| 2017/0199770 A1* | 7/2017 | Peteva | G06F 9/5088 |
| 2018/0060120 A1* | 3/2018 | Nassi | G06F 9/44 |
| 2018/0157517 A1* | 6/2018 | Dong | G06F 9/45558 |
| 2018/0270125 A1* | 9/2018 | Jain | G06F 11/07 |
| 2018/0349199 A1* | 12/2018 | Vyas | G06F 9/4856 |
| 2019/0220319 A1* | 7/2019 | Parees | G06F 9/5038 |
| 2019/0235922 A1* | 8/2019 | Iovanna | G06F 9/505 |
| 2019/0288915 A1* | 9/2019 | Denyer | G06Q 10/06315 |
| 2019/0332443 A1* | 10/2019 | Kelly | G06F 9/5077 |
| 2020/0034193 A1* | 1/2020 | Jayaram | G06F 3/0653 |
| 2020/0133718 A1* | 4/2020 | Koehler | G06F 9/4856 |
| 2020/0153898 A1* | 5/2020 | Sabath | H04L 41/0886 |
| 2020/0169602 A1* | 5/2020 | Aronovich | G06F 9/5027 |

* cited by examiner

*Primary Examiner* — Isaac T Tecklu
(74) *Attorney, Agent, or Firm* — Thomas | Horstemeyer LLP

(57) ABSTRACT

Various examples are disclosed for workload placement and workload balancing across a cluster of nodes. Workloads can be migrated between nodes to free sufficient CPU and memory resources to place a new workload onto a cluster. Workloads can also be migrated between pods to balance CPU and memory utilization of nodes in a cluster.

20 Claims, 10 Drawing Sheets

| Node1 | Avail | Total |
|---|---|---|
| vCPU | 200 | 1000 |
| Mem | 500 | 2000 |

| Node2 | Avail | Total |
|---|---|---|
| vCPU | 200 | 1000 |
| Mem | 400 | 2000 |

| Node3 | Avail | Total |
|---|---|---|
| vCPU | 200 | 1000 |
| Mem | 300 | 2000 |

| Pod1 | Req |
|---|---|
| vCPU | 200 |
| Mem | 400 |

| Pod2 | Req |
|---|---|
| vCPU | 250 |
| Mem | 600 |

| Pod3 | Req |
|---|---|
| vCPU | 350 |
| Mem | 500 |

| Pod4 | Req |
|---|---|
| vCPU | 300 |
| Mem | 500 |

| Pod5 | Req |
|---|---|
| vCPU | 200 |
| Mem | 300 |

| Pod6 | Req |
|---|---|
| vCPU | 300 |
| Mem | 800 |

| Pod7 | Req |
|---|---|
| vCPU | 100 |
| Mem | 250 |

| Pod8 | Req |
|---|---|
| vCPU | 300 |
| Mem | 700 |

| Pod9 | Req |
|---|---|
| vCPU | 400 |
| Mem | 700 |

| New | Req |
|---|---|
| vCPU | 300 |
| Mem | 600 |

201

Aggregate Available Capacity
vCPU: 600   Mem: 1200

FIG. 2

| Node3 | Avail | Total |
|---|---|---|
| vCPU | 200 | 1000 |
| Mem | 300 | 2000 |

| Pod1 | Req |
|---|---|
| vCPU | 200 |
| Mem | 400 |

| Pod7 | Req |
|---|---|
| vCPU | 100 |
| Mem | 250 |

| Pod8 | Req |
|---|---|
| vCPU | 300 |
| Mem | 700 |

| Pod9 | Req |
|---|---|
| vCPU | 400 |
| Mem | 700 |

| Node2 | Avail | Total |
|---|---|---|
| vCPU | 200 | 1000 |
| Mem | 400 | 2000 |

| Pod4 | Req |
|---|---|
| vCPU | 300 |
| Mem | 500 |

| Pod5 | Req |
|---|---|
| vCPU | 200 |
| Mem | 300 |

| Pod6 | Req |
|---|---|
| vCPU | 300 |
| Mem | 800 |

| Node1 | Avail | Total |
|---|---|---|
| vCPU | 200 | 1000 |
| Mem | 500 | 2000 |

| Pod10 | Req |
|---|---|
| vCPU | 300 |
| Mem | 600 |

— 201

| Pod2 | Req |
|---|---|
| vCPU | 250 |
| Mem | 600 |

| Pod3 | Req |
|---|---|
| vCPU | 350 |
| Mem | 500 |

FIG. 4

| Node1 | Avail | Total |
|---|---|---|
| vCPU | 100 | 1000 |
| Mem | 1500 | 2000 |

| Node2 | Avail | Total |
|---|---|---|
| vCPU | 300 | 1000 |
| Mem | 400 | 2000 |

| Node3 | Avail | Total |
|---|---|---|
| vCPU | 800 | 1000 |
| Mem | 300 | 2000 |

| Pod1 | Req |
|---|---|
| vCPU | 500 |
| Mem | 300 |

| Pod2 | Req |
|---|---|
| vCPU | 400 |
| Mem | 200 |

| Pod3 | Req |
|---|---|
| vCPU | 300 |
| Mem | 500 |

| Pod4 | Req |
|---|---|
| vCPU | 400 |
| Mem | 1100 |

| Pod5 | Req |
|---|---|
| vCPU | 100 |
| Mem | 950 |

| Pod6 | Req |
|---|---|
| vCPU | 100 |
| Mem | 750 |

FIG. 5

| Node1 | Avail | Total |
|---|---|---|
| vCPU | 100 | 1000 |
| Mem | 1500 | 2000 |

| Node2 | Avail | Total |
|---|---|---|
| vCPU | 300 | 1000 |
| Mem | 400 | 2000 |

| Node3 | Avail | Total |
|---|---|---|
| vCPU | 800 | 1000 |
| Mem | 300 | 2000 |

| Pod1 | Req |
|---|---|
| vCPU | 500 |
| Mem | 300 |

| Pod3 | Req |
|---|---|
| vCPU | 300 |
| Mem | 500 |

| Pod5 | Req |
|---|---|
| vCPU | 100 |
| Mem | 950 |

| Pod2 | Req |
|---|---|
| vCPU | 400 |
| Mem | 200 |

| Pod4 | Req |
|---|---|
| vCPU | 400 |
| Mem | 1100 |

| Pod6 | Req |
|---|---|
| vCPU | 100 |
| Mem | 750 |

FIG. 6

| Node1 | Avail | Total |
|---|---|---|
| vCPU | 400 | 1000 |
| Mem | 950 | 2000 |

| Node2 | Avail | Total |
|---|---|---|
| vCPU | 300 | 1000 |
| Mem | 400 | 2000 |

| Node3 | Avail | Total |
|---|---|---|
| vCPU | 500 | 1000 |
| Mem | 850 | 2000 |

| Pod1 | Req |
|---|---|
| vCPU | 500 |
| Mem | 300 |

| Pod3 | Req |
|---|---|
| vCPU | 300 |
| Mem | 500 |

| Pod5 | Req |
|---|---|
| vCPU | 100 |
| Mem | 950 |

| Pod6 | Req |
|---|---|
| vCPU | 100 |
| Mem | 750 |

| Pod4 | Req |
|---|---|
| vCPU | 400 |
| Mem | 1100 |

| Pod2 | Req |
|---|---|
| vCPU | 400 |
| Mem | 200 |

FIG. 7

WORKLOAD PLACEMENT AND BALANCING WITHIN A CONTAINERIZED INFRASTRUCTURE

BACKGROUND

Network infrastructures can provide the hardware and software resources required for the operation and management of an enterprise. For example, a network infrastructure can include a hyper-converged infrastructure (HCI), a converged infrastructure, a hierarchical cluster engine (HCE) infrastructure, and/or any other type of infrastructure. An HCI, for example, can provide an enterprise with modular and expandable central processing unit (CPU), memory, storage, and network resources as well as system backup and recovery. In a hyper-converged infrastructure, CPU, memory, storage, and network resources are brought together using preconfigured and integrated hardware. Workloads or tasks can be allocated to hardware with sufficient CPU and memory resources to handle the workload. When a workload requires more resources than are available in a particular host, additional hardware can be assigned to the workload.

Workloads, such as applications or virtual machines, can be allocated across a fleet of physical machines or across a cluster of hosts using an orchestration platform. "Containerization" is a term that refers to operating-system-level virtualization that can be used by orchestration platforms to establish containers that are isolated from each other and deployed across a cluster of physical or virtual machines, referred to as nodes, in an HCI.

With some containerized deployments, an assumption is made that they are small and stateless, so that they are already optimized for operations and there is nothing more to be done. However, in larger ecosystems, the container schedulers or orchestrators have a tendency to continually allocate physical resources to a deployment even when sufficient CPU and memory resources are available for new deployments across multiple nodes.

Orchestrators can be tasked with managing a set of nodes (VMs or Physical Servers) to deploy requested containers. When containers are configured for deployment, a 'request' containing a minimum requirement for each resource within the container (e.g., CPU and memory) is provided to or generated by the orchestrator service. The orchestrator reserves this minimum capacity and takes care of placing these containers on different nodes based on their resource requirement and availability within a cluster of nodes. If the requested minimum capacity is not available on any one node, some schedulers will fail to place the container or will request additional server resources within the HCI without first attempting to relocate or migrate existing containers to other existing nodes to create sufficient capacity within the existing cluster. This can result in increased costs to the computing environment, as unneeded resources might be allocated to a cluster.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2 is a drawing showing how an example of the disclosure can schedule workloads in a customer using an orchestrator service.

FIG. 4 is a drawing showing how an example of the disclosure can schedule workloads in a customer using an orchestrator service.

FIG. 5 is a drawing showing how an example of the disclosure can schedule workloads in a customer using an orchestrator service.

FIG. 6 is a drawing showing how an example of the disclosure can schedule workloads in a customer using an orchestrator service.

FIG. 7 is a drawing showing how an example of the disclosure can schedule workloads in a customer using an orchestrator service.

DETAILED DESCRIPTION

In modern computing environments, applications are often being deployed as containers using an orchestration service. Containers are an abstraction that packages applications and their dependencies together and that run atop a host operating system. Multiple containers can be run on a host operating system. A container runtime engine can run atop the host operating system, which can abstract the host operating system from the respective containers. Multiple applications can be deployed on a host machine in this way. Kubernetes and Docker are two among many industry applications of containerization technology. These and other architectures can include an orchestration service that determines where to place containers in a cluster of physical or virtual machines in a computing environment.

Another way of deploying applications involves deploying the application and its dependencies along with its own virtual machine that runs atop a hypervisor on a host device. A hypervisor enables multiple VMs to be run on the host device. There can be tradeoffs with deploying an application in this way because each VM that runs on a host device may require its own operating system, which can increase the deploying and maintenance complexity of the systems.

When deploying an application using containerization technology, many orchestrator services do so in a resource inefficient manner. If a requested minimum CPU and memory capacity is not available on any node within a cluster of machines in the computing environment, current schedulers might fail to place the container. In this scenario, the scheduler or an administrator might request or allocate additional resources, such as additional physical or virtual machines, to the cluster to provide ample CPU and memory capacity for the requested container. The orchestrator service might do so even when total available capacity across all nodes is greater than the requested minimum capacity for the requested container or workload. Allocating additional resources can add to the cost of the cluster.

Accordingly, various implementations are described herein to achieve optimal workload placement while considering resource usage and resource constraints. In particular, systems and methods of this disclosure can utilize more of the available resources across containerized infrastructure by optimizing the placement process of new workloads. Embodiments of the disclosure can migrate workloads to create sufficient capacity within an existing cluster of nodes before allocating additional resources to the cluster. By first migrating rather than allocating additional resources to the cluster, cost savings can be achieved.

Figure 1:
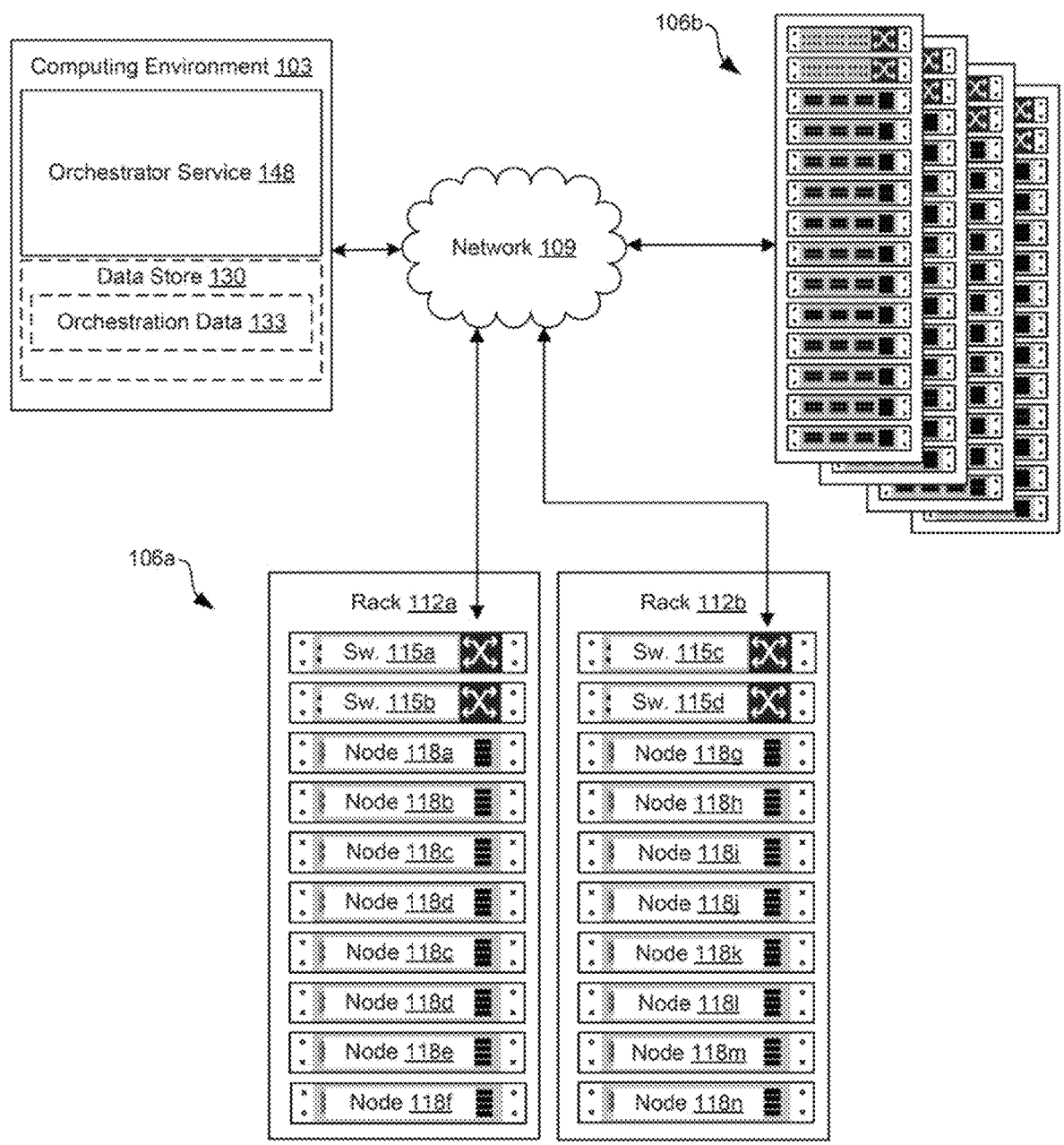
FIG. 1 is a drawing of an example of a network infrastructure including components connected through a network including a management service for determining placement of workloads.

With reference to FIG. 1, an example of a network infrastructure 100 in which a containerized environment can be implemented is shown. The network infrastructure 100 can include a computing environment 103 and various computing clusters 106a . . . 106b in communication with one other over a network 109. A computing cluster 106 can also include a cloud computing environment in which computing resources, such as physical or virtual machines, can be allocated to the cluster. While the computing clusters 106 are shown as racks that can be deployed in a data center, each cluster 106 can also represent a collection of virtual machines or computing resources allocated in a cloud environment to the cluster 106. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks. The network 109 can also include switches, routers, and other network devices. The network devices can be held or integrated within racks or be external to the racks.

In various embodiments, the computing clusters 106 can include a plurality of devices, also referred to herein as "nodes" or "hosts," that are installed in racks 112 (e.g., 112a, 112b) which can make up a server bank, aggregate computing system, or a computer bank in a data center or other like facility. The devices in the computing clusters 106 can include any number of physical machines, virtual machines, virtual appliances, and software, such as operating systems, drivers, hypervisors, scripts, and applications. The rack 112 can be a rack that is part of a hyper-converged infrastructure having CPU, memory, storage, and network resources that are provided using integrated and/or preconfigured hardware. In other cases, a rack can be part of a converged infrastructure or another type of infrastructure. The rack 112 can have a preconfigured number of switches, or a preconfigured number of slots for switches or other network devices. For example, the rack 112 can have switches 115 (e.g., 115a, 115b, 115c, 115d). The switches 115 can be top-of-rack switches or other integrated network devices of the rack 112. While not shown, the switches 115 can also be further connected to other switches and network devices including spine switches, End-of-Row switches, Middle-of-Row switches, or other switches, routers, and the like. The switches 115 can also be connected to routers, which can route traffic between racks or between sites. The rack 112 can also include a number of hosts, or a preconfigured number of slots or bays for hosts.

For example, the rack 112 can have nodes 118 (e.g., 118a-118n). Where the rack 112 is part of a hyper-converged infrastructure, each of the nodes 118 can provide CPU, memory, storage, and network resources. Each of the nodes 118, or host devices, can be a processor-based system, such as a computer system, and can include at least one computing device, at least one storage device, and at least one network device. While referred to in the singular for clarity, multiple computing devices, storage devices, and network devices can be included in each host. The computing device can include a processor circuit, such as one that includes a processor and a memory. The storage devices can include memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components. The network devices can include network interface controllers or NICs switches, routers, and other network devices. The hosts can be utilized to perform or execute instructions, including processes, programs, applications, and other tasks that can be utilized in concert, for example, using software like the software defined datacenter (SDDC) manager, VMware vSphere®, vSAN®, NSX®, ESX®, ESXi®, and other virtualization software or tools.

The rack 112 can be part of a single site or as a part of a geographically disparate configuration of various racks 112. In some cases, one or more of the sites can be provided by a service that provides CPU, memory, storage, network, and other resources to an enterprise or another customer of the service. In other cases, one or more of the sites can also be owned or operated by the enterprise.

The various physical and virtual components of the computing clusters 106 can process workloads 121 (e.g., 121a . . . 121e). Workloads 121 can represent virtual machines, containers, or applications executed on nodes 118 within the HCI. Additionally, a workload 121 can include a pod, which represents a set of running containers. A pod can also represent a single container. A pod can represent an application and its dependences, such as other applications, services, and data stores, that are necessary to deploy the application in a cluster. Workloads 121 can be executed on a host device that runs a hypervisor that facilitates access to the physical resources of the host device by workloads 121 running atop the hypervisor. For example, VDI functionalities, IaaS functionalities, SaaS functionalities, IoT functionalities, VMware® Photon OS, AirWatch®, and other functionalities and application types can be provided by executing workloads 121 on nodes 118. Each workload 121 can have a host assignment that identifies the node 118 within the HCI on which the workload 121 is executed.

Referring now to the computing environment 103, the computing environment 103 can include, for example, a server or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. Although shown separately from the computing clusters 106, it is understood that in some examples the computing environment 103 can be included as all or a part of the computing clusters 106.

The computing environment 103 can include or be operated as one or more virtualized computer instances in some examples. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing clusters 106 and client devices for end users over the network 109, sometimes remotely, the computing environment 103 can be described as a remote computing environment 103 in some examples. Additionally, in various examples, the computing environment 103 can be implemented in nodes 118 of a rack 112 and can manage operations of a virtualized or cloud computing environment. Hence, in some examples, the computing environment 103 can be referred to as a management cluster in the computing clusters 106.

The computing environment 103 can include a data store 130. The data store 130 can include memory of the computing environment 103, mass storage resources of the computing environment 103, or any other storage resources on which data can be stored by the computing environment 103. The data store 130 can include memory of the nodes 118 in some examples. For instance, the data store 130 can include one or more relational databases, such as structure query language (SQL) databases, non-SQL databases, or other relational or non-relational databases. The data stored in the data store 130, for example, can be associated with the operation of the various services or functional entities described below.

The data store 130 can include a database or other memory that includes, for example, orchestration data 133. The orchestration data 133 can include information pertaining to the various workloads executing on the nodes 118. The orchestration data 133 can identify where workloads are placed within a cluster of nodes 118 and an amount of reserved CPU, memory, or network resources within the cluster that is allocated to respective workloads. For example, if a pod is placed within a cluster of nodes 118 by a user, the request might include an amount of CPU and memory resources required by the pod, which can be considered when placing the pod within the cluster. The orchestration data 133 can also include other configuration data for respective containers and pods, such as security policies, credentials, or other deployment data.

The components executed on the computing environment 103 can include, for example, an orchestrator service 148 as well as other applications, services, processes, systems, engines, or functionality not discussed in detail herein. The orchestrator service 148 can oversee the placement of containers, applications, or pods within the network infrastructure 100 or a cluster of nodes 118 within the network infrastructure 100. The orchestrator service 148 can also manage computing clusters 106, as well as the physical and virtual computing resources that make up the computing clusters 106. In some examples, an enterprise, organization, or other entity can operate the orchestrator service 148 or other application to oversee or manage the operation of devices in the racks 112, such as nodes 118, switches 115, power supplies, cooling systems, and other components. The orchestrator service 148 can manage the deployment of various applications that are deployed by an enterprise into a containerized infrastructure that is implemented in the nodes 118 within a cluster 106.

To deploy an application onto a node 118, a user can submit a configuration package or request that identifies an application, dependencies or libraries, and configuration data associated with the application. The request can be submitted to the orchestrator service 148, which can specify a requested CPU capacity and a memory capacity for the application. The orchestrator service 148 can determine how much CPU and memory capacity would be required for deployment of the application, and can select an appropriate node 118 within a cluster 106 on which the application should be deployed.

The orchestrator service 148 can identify a node 118 within the cluster 106 that has sufficient CPU and memory capacity, and can deploy the application associated with the request onto a node 118. The application can be deployed as one or more containers that are executed by a containerization runtime running on the node 118. Multiple containers can be bundled together into a pod, which represent multiple containers that might be necessary to deploy a particular application.

In the case where the individual nodes 118 within a cluster 106 have insufficient CPU or memory capacity to deploy a pod, the orchestrator service 148 can perform migrations of existing deployed pods to free sufficient resources. In prior art orchestration services, an orchestrator might simply request additional nodes within a cluster—rather than working to free up resources on existing nodes 118.

Additionally, the orchestrator service 148 can balance the deployment of pods within a cluster 106 to balance the CPU and memory capacity on each of the nodes 118 within the cluster 106. In this way, the orchestrator service 148 can work to ensure that the available CPU and memory capacities of the nodes 118 in a cluster 106 are relatively close to one another. Balancing CPU and memory resources across the nodes can lead to improvement in performance and reduction in container/application failures. Imbalanced placement of containers within a cluster 106 can lead to node 118 or application failures. For example, placing a pod on a node that results in 90% CPU utilization might result in a future failure in the case of a workload spike in the future. If a balancing scenario can be identified where no CPU in the cluster is at 70% or greater utilization, these failures can be prevented. Similarly, as another example, placing a pod on a node that results in 90% memory utilization might result in a future failure in the case of a workload spike. If a balancing scenario can be identified where no node 118 in the cluster is at 70% or greater memory utilization, failures can be prevented.

Referring to FIG. 2, shown is an example scenario in which various nodes 118 within a cluster are shown. The scenario shown in FIG. 2 illustrates how the orchestrator service 148 can place a new pod 201 within a cluster 106 of nodes 118 by migrating one or more pods to create sufficient CPU and memory resources to allow the pod to be placed. In the scenario shown in FIG. 2, pod 201 can represent a request submitted by a user to deploy an application to the orchestrator service 148. The request can either identify the necessary CPU and memory resources needed to deploy the application, or the orchestrator service 148 can determine the necessary CPU and memory resources needed to deploy the application based upon the properties of the request, such as the application, dependencies, and other aspects of the application.

In the example scenario of FIG. 2, the pod 201 requires 300 units of virtual CPU (vCPU) and 600 units of memory capacity. The units of vCPU capacity can represent gigahertz of processing cycles or another unit of vCPU capacity in the cluster 106. The units of memory capacity can represent gigabytes of memory of select components of the network infrastructure 100 in communication through the network 109. The units shown are merely for illustrative purposes to show the workload placement concepts that are described herein. Returning to the example scenario of FIG. 2, although the pod 201 requires 300 units of vCPU and 600 units of memory capacity, no node within the cluster 106 currently has sufficient capacity to accept placement of the pod 201.

Therefore, the orchestrator service 148 can determine whether migrations of existing pods within the cluster 106 can free sufficient CPU and memory resources so that the pod 201 can be placed on an existing node 118. Rather than allocate an additional node 118 to the cluster 106 or additional physical resources to the cluster 106, the orchestrator service 148 can perform migrations to place the pod 201 within the cluster 106, which can reduce the operational costs associated with the cluster 106 compared to other orchestration frameworks.

As shown in the cluster 106 of FIG. 2, Node1, Node2, or Node3 do not have sufficient memory of vCPU capacity to accept placement of the pod 201. In cluster 106 in FIG. 2, even though aggregate CPU and memory capacity meet or exceed the amount requested and required by the node 201, individual nodes 118 within the cluster 106 do not have sufficient CPU and memory resources to accept the pod 201. Accordingly, the orchestrator service 148 can examine the placement of existing pods within the nodes 118 to determine whether pods can be migrated between nodes 118 to free enough CPU and memory capacity to place the node 201 within the cluster 106.

Figure 3:
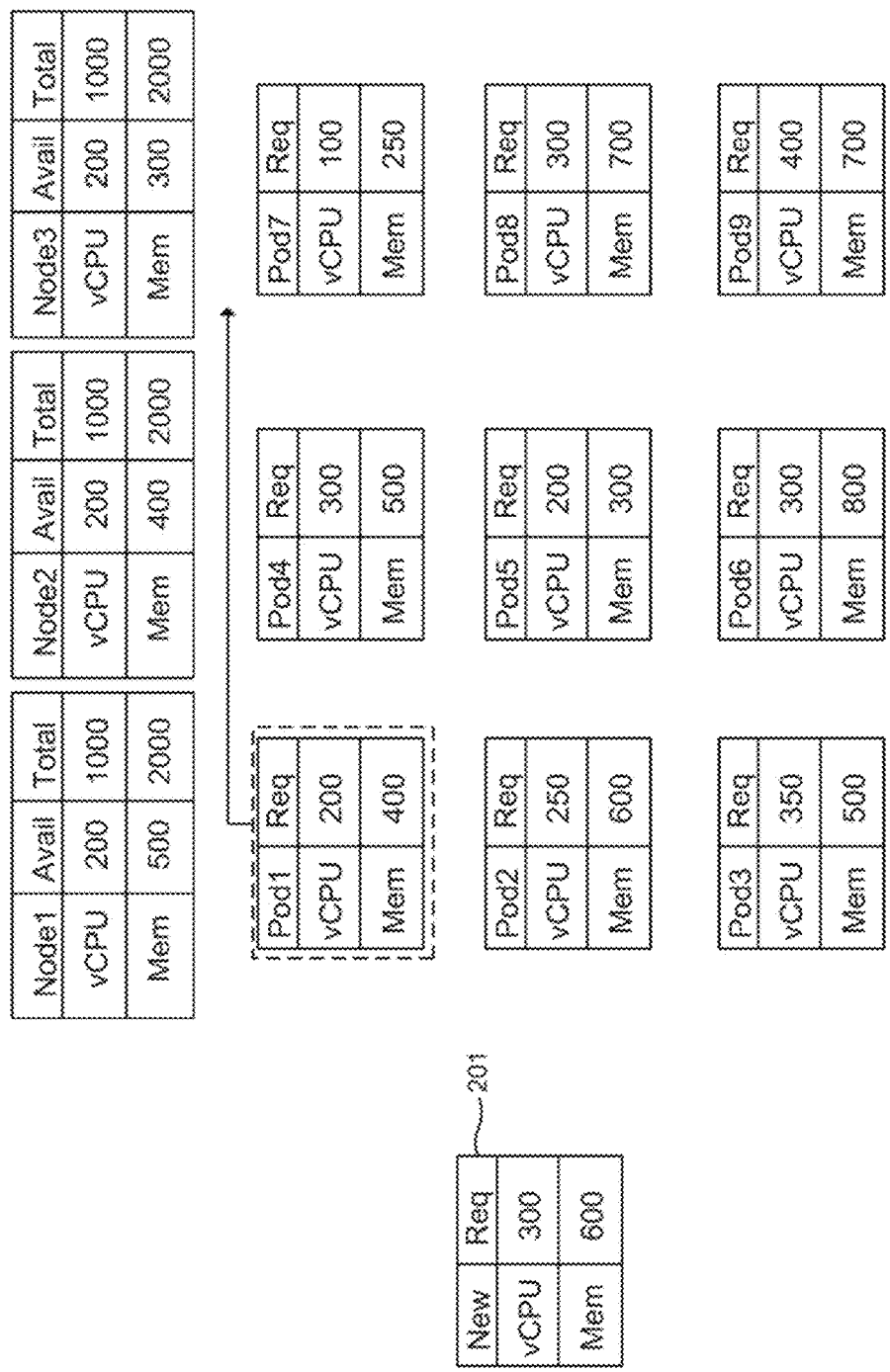
FIG. 3 is a drawing showing how an example of the disclosure can schedule workloads in a customer using an orchestrator service.

Next, reference is now made to FIG. 3, which continues the scenario introduced in FIG. 2. In FIG. 3, the orchestrator service 148 can perform a migration of Pod1 to Node3 within the cluster 106. The orchestrator service 148 can determine that performing the migration can free up sufficient CPU and memory capacity within Node1 for placement of pod 201 in Node1, and can determine that Node3 has sufficient CPU and memory capacity for migration of Pod1. As shown in FIG. 4, the orchestrator service 148 can migrate Pod1 to Node3 and can place pod 201 into Node1 as Pod10.

The orchestrator service 148 can select Node1 as the node to be relocated by computing a placement priority of the nodes within the cluster 106. The placement priority of a node 118 can represent a measure based on the amount of resources (e.g., CPU and memory) that need to be freed in order to place a new workload, such as pod 201, onto a node 118. If the amount of resources that need to be freed on a node 118 to place a workload onto the node 118 is relatively low, then its placement priority is higher than another node 118 that requires more resources to be freed in order to place a workload onto the node 118. By utilizing placement priority, the orchestrator service 148 can identify a node 118 on which to place a requested workload faster than a process that does not utilize placement priority.

In one example, the placement priority can reduce the available CPU and memory on a node 118 to a single value using a pairing function. The pairing function can weigh CPU and memory using weighting values. The placement algorithm can analyze the cluster 106 to place a new workload by starting with the node 118 having the highest placement priority and attempting to identify a pod placed on the node 118 that is lower in utilized CPU and memory capacity than the requested workload. The utilized CPU and memory capacity of pods on a node 118 can be reduced to a single value using the pairing function. In one embodiment, the pod having the highest utilized CPU and memory capacity that is also lower than the requested workload can be identified.

The identified pod can then be recursively placed onto another node 118 within the cluster utilizing the same methodology. In other words, the identified pod can be recursively placed onto another node 118 within the cluster by identifying another node 118 according to placement priority, placing the pod onto a node 118 if there is sufficient CPU and memory capacity, or migrating yet another pod to create sufficient CPU and memory capacity on a node 118. The placement algorithm can continue recursive execution, and if sufficient CPU and memory capacity cannot be found to place all pods on a node 118 within the cluster, the orchestrator service 148 can allocate additional physical resources to the cluster 106, such as by allocating an additional node 118 or additional CPU and memory to an existing node 118 within the cluster 106.

The above placement algorithm is referred to as a single pod migration algorithm. The algorithm is also illustrated in the following pseudocode, where the "workload" represents a requested workload, container, or pod that is submitted to the orchestrator service 148 for placement within the cluster 106, and "nodes" represent the nodes 118 within the cluster 106.

```
placeCapacity (workload, nodes)
IF given workload is placed directly on a node from all nodes
    THEN
    place the capacity on the node directly.
    RETURN;
ELSE
    compute placement priority based on available capacity
    utilizing pairing function
FOR each node from high to low priority
REPEAT
    p = compute one pod on current node which is lower in
    capacity than workload
    IF p is found
        THEN
        remove p from the current node.
        add the workload to the node.
        placeCapacity (p, nodes)
    ELSE
        workload cannot be placed on this node
    END
```

In an alternative version of a placement algorithm, a multi-pod migration algorithm can be utilized. In a multi-pod migration algorithm, the orchestrator service 148 can identify a list of pods on a particular node 118 that have a lower combined utilized capacity (e.g., CPU and memory capacity) than the new workload. Then, for each pod in the identified list of pods, the orchestrator service 148 can attempt to migrate each of the pods to a different node 118 in the cluster 106.

The algorithm is also illustrated in the following pseudocode, where the "workload" represents a requested workload, container, or pod that is submitted to the orchestrator service 148 for placement within the cluster 106, and "nodes" represent the nodes 118 within the cluster 106. The list of pods on a node 118 that are eligible for migration is computed using dynamic programming to generate n! combinations of pods, where n is the number of pods on the node 118. The orchestrator service 148 can select the best combination having a minimum number of pods to migrate from the current node 118 in order to place the requested workload.

```
multiPlaceCapacity(workload, nodes)
IF given workload is placed directly on a node from all nodes
    THEN
    place the capacity on the node directly.
    RETURN;
```

```
    ELSE
        compute placement priority based on available capacity
            using pairing function
        FOR each node from high to low priority
        REPEAT
            pl = compute a list of pods on current node which is lower
                in capacity than workload using dynamic programming
            IF pl is found
            THEN
                FOR EACH pod p in pl
                remove p from the current node.
                add the workload to the node.
                multiPlaceCapacity (p, nodes)
            ELSE
                workload cannot be placed on this node
END
```

Referring next to FIG. 5, a different scenario is illustrated. The orchestrator service 148 can also balance the placement of workloads or pods within the cluster 106. Balancing the placement of workloads with a cluster 106 can improve the reliability of the cluster 106 and the applications that are deployed across the cluster 106. For example, if CPU intensive tasks are all scheduled on the same node 118 and memory intensive tasks are scheduled together on another node 118, there is a risk of failure of the workloads or the nodes 118 if a spike in CPU or memory usage occurs. Additionally, there is a risk of application slowdown and container/pod failures in this scenario. In a typical deployment, there are generally ample resources across a cluster 106 to balance the CPU and memory requirements of the various pods and containers in the deployment, so optimization of their placement can improve cluster 106 reliability.

Returning to FIG. 5, shown is a scenario where the orchestrator service 148 can balance a deployment of pods or containers on a cluster 106. In the depicted scenario, Node1 has been scheduled such that 90% of its CPU resources are reserved to Pod1 and Pod2. However, 75% of its memory resources are unutilized. Additionally, Node3 has been scheduled such that 85% of its memory resources are reserved to Pod5 and Pod6. Node2 has been scheduled such that only 20% of its memory capacity is unscheduled, or unutilized.

Therefore, the orchestrator service 148 can periodically balance the placement of workloads on the nodes 118 in the cluster 106 to more evenly balance the available CPU and memory capacity on each of the nodes 118. As shown in FIG. 6, the orchestrator service 148 can determine that swapping the placement of Pod2 and Pod6 can more evenly balance the available CPU and memory capacities of the nodes 118 in the cluster 106. As shown in FIG. 7, by performing the swap of the placement of Pod2 and Pod6, the utilized memory capacity of Node1 and Node3 is more evenly balanced, which can improve the reliability of the cluster 106 by improving its ability to handle peak loads using the same memory and CPU resources.

The process utilized by the orchestrator service 148 to balance the placement of pods within the cluster 106 can generate swap recommendations that cause resources across the cluster 106 to become more balanced. The orchestrator service 148 can cause a mix of CPU and memory intensive pods or containers to be placed on the common nodes 118 throughout the cluster to balance the CPU and memory requirements placed on the nodes 118. The orchestrator service 148 can collect the available CPU and memory capacity of the nodes 118 within the cluster 106, perform a balancing process on the availability data, generate swap recommendation to swap the placement of pods or containers, and then perform the swap operations.

The balancing process can involve the following operations. First, a pivot ratio of the system is calculated. The pivot ratio is defined as the ratio of total available CPU capacity and total available memory capacity across all nodes 118 of the cluster 106. In an ideally balanced cluster 106, the nodes 118 of the cluster 106 should have a ratio of available CPU to memory that is equivalent to the pivot ratio. The pivot ratio can also be expressed in terms of available memory to CPU or mathematically equivalent or similar expressions.

$$\text{pivot ratio} = \frac{\sum_{node=1}^{node=n} \text{available } CPU}{\sum_{node=1}^{node=n} \text{available memory}}$$

The orchestrator service 148 can also determine an availability ratio of each node 118, which represents the ratio of available CPU to memory of each node 118. The available ratio can also be expressed in terms of available memory to CPU or mathematically equivalent or similar expressions.

$$\text{available ratio} = \frac{\text{available } CPU \text{ capacity on node}}{\text{available memory capacity on node}}$$

The orchestrator service 148 can then calculate the system entropy of the cluster 106. The system entropy represents the deviation of the availability ratio of each node 118 from the pivot ratio of the cluster 106. The greater the system entropy, the more imbalanced the cluster 106.

$$\text{system entropy} = \sum_{node=1}^{node=n} \text{abs}\left(\frac{\text{available } CPU}{\text{available memory}} - \text{pivot ratio}\right)$$

Figure 8:
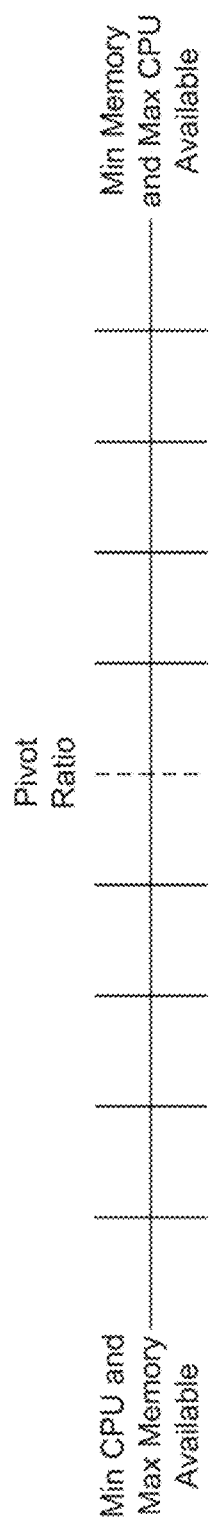
FIG. 8 is a drawing showing how examples of the disclosure can schedule workloads in a cluster using an orchestrator service.

Next, the orchestrator service 148 can sort the nodes 118 in the cluster 106 based upon the pivot ratio and place the nodes 118 on a number line relative to the pivot ratio. As shown in FIG. 8, nodes with minimum available CPU and maximum available memory can be placed on a first side of the number line while nodes with maximum available CPU and minimum available memory can be placed towards an opposite side of the number line from the system pivot ratio. The leftmost node can be selected along with the rightmost pod. The orchestrator service 148 can determine whether swapping these pods, if they are on different nodes 118, would decrease the system entropy. If so, the orchestrator service 148 can swap the pods. If not, the orchestrator service 148 can identify pairs of pods or containers that are closer together on the number line to identify another pair of pods that if swapped can reduce the system entropy. The orchestrator service 148 can terminate the balancing process when there is no improvement in the entropy or there are no pods that are candidates to be swapped, which occurs if all nodes 118 are on the system side of the pivot ratio on the number line. An example number line is shown in FIG. 7. An actual number line need not be generated to perform the balancing process. Instead, the orchestrator service 148 can generate a mathematical equivalent of a number line and attempt to perform swaps of pods to balance the nodes 118.

Figure 9:
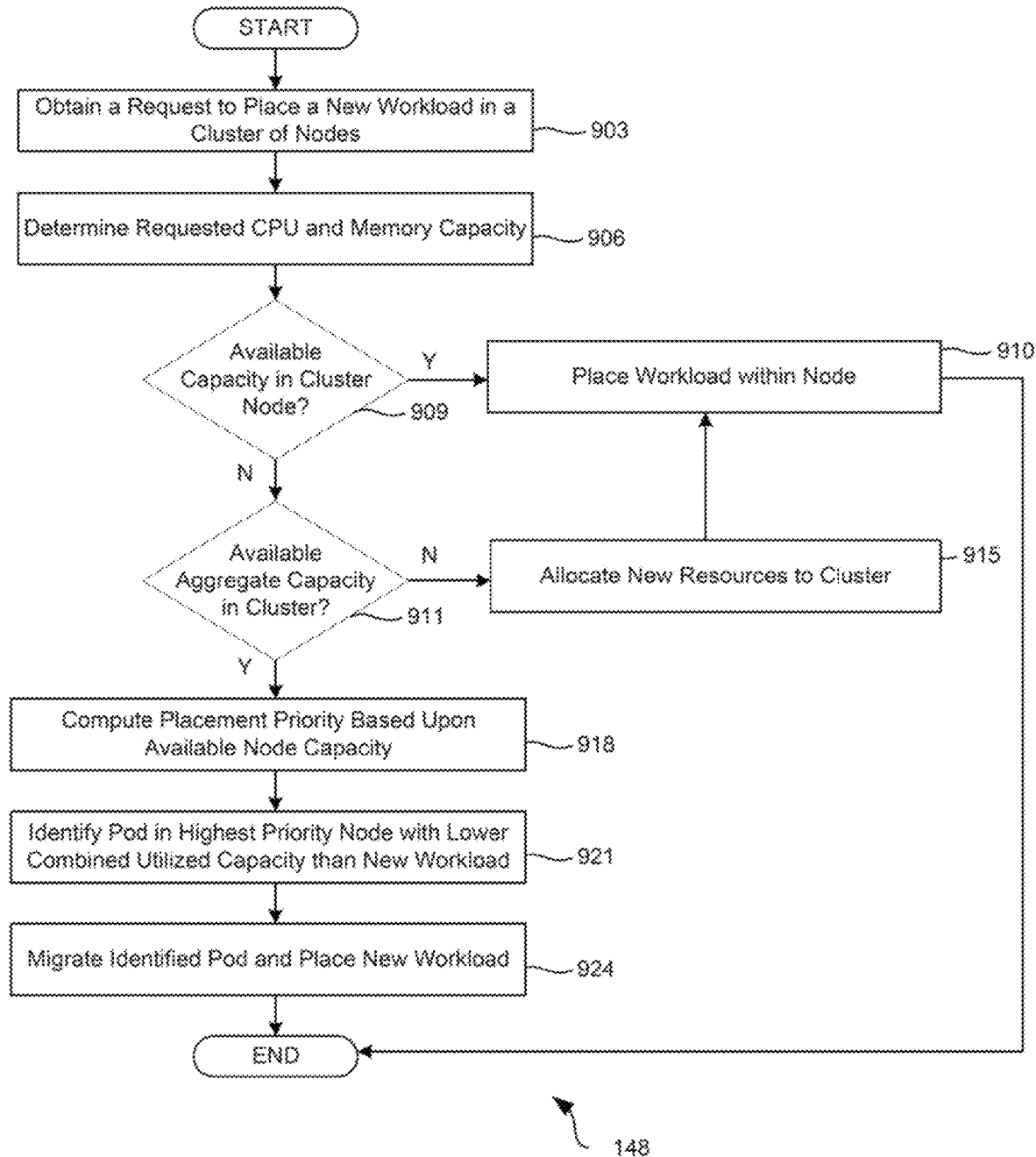
FIG. 9 is a flowcharts that illustrates functionality implemented by components of the network environment of FIG. 1.

Moving on to FIG. 9, shown is a flowchart that provides one example of the operation of a portion of the orchestrator service 148. The flowchart of FIG. 9 can be viewed as depicting an example method implemented by the orchestrator service 148. The separation or segmentation of functionality as discussed herein is presented for illustrative purposes only. FIG. 9 provides an example of functionality that can be performed to place a workload, such as a pod or container, onto a node 118 within the cluster 106 and potentially migrate existing workloads to free sufficient CPU and/or memory capacity within the cluster 106 to do so.

Beginning with step 903, the orchestrator service 148 can obtain a request to place a new workload, such as a pod or container, within a cluster 106. In some scenarios, if a pod is placed within a cluster of nodes 118 by a user, the request might include an amount of CPU and memory resources required by the pod, which can be considered when placing the pod within the cluster 106. The request can include an application and its dependencies that a user wishes to deploy using the orchestrator service 148.

At step 906, the orchestrator service 148 can determine the requested CPU and memory associated with the new workload. The orchestrator service 148 can either extract requested CPU and memory requirements from the request submitted to the orchestrator service 148 to place the workload, or can determine the CPU and memory requirements of the new workload based upon an analysis of the application and its dependencies.

At step 909, the orchestrator service 148 can determine whether sufficient CPU and memory capacity exist in a node 118 within the cluster 106 to place the new workload. If so, the process proceeds to step 910, where the orchestrator service 148 places the workload in a node 118 having sufficient CPU and memory capacity. At step 910, the orchestrator service 148 places the workload either into an identified node 118 with sufficient CPU and memory capacity, or into a new or existing node 118 for which newly allocated resources were added at step 915. If the cluster 106 does not contain a node 118 with sufficient CPU and memory capacity to place the requested workload, the process proceeds from step 909 to step 911.

At step 911, the orchestrator service 148 can determine whether there is available aggregate CPU and memory capacity within the cluster 106 to place the new workload. In other words, if the requested CPU and memory of the new workload are each 100, the orchestrator service 148 can determine whether there is at least 100 CPU and 100 memory of available capacity within the cluster 106. If there is not sufficient aggregate capacity within the cluster 106, the process can proceed to step 915, where the orchestrator service 148 allocates additional CPU and memory resources to the cluster 106 to provide sufficient CPU and memory resources for the new workload. If there are already sufficient aggregate CPU and memory resources within the cluster, the process can proceed to step 918.

At step 918, the orchestrator service 148 can compute the placement priority of the nodes 118 within the cluster 106. As described above, the placement priority can represent a measure based on the amount of resources (e.g., CPU and memory) that need to be freed in order to place a new workload onto a node 118. In one example, the placement priority can reduce the available CPU and memory on a node 118 to a single value using a pairing function. The pairing function can weigh CPU and memory using various weighting values. The placement algorithm can analyze the cluster 106 to place a new workload by starting with the node 118 having the highest placement priority and attempting to identify a pod placed on the node 118 that is lower in utilized CPU and memory capacity than the requested workload.

At step 921, the orchestrator service 148 can then identify a pod or workload in the highest priority node 118 (by placement priority) with a lower combined utilized capacity than the new workload. The utilized CPU and memory capacity of pods on a node 118 can be reduced to a single value using the pairing function. In one embodiment, the pod having the highest utilized CPU and memory capacity that is also lower than the requested workload can be identified.

At step 924, the identified pod can then be recursively placed onto another node 118 within the cluster utilizing the same methodology. In other words, the identified pod can be recursively placed onto another node 118 within the cluster by identifying another node 118 according to placement priority, placing the pod onto a node 118 if there is sufficient CPU and memory capacity, or migrating yet another pod to create sufficient CPU and memory capacity on a node 118. The placement algorithm can continue recursive execution, and if sufficient CPU and memory capacity cannot be found to place all pods on a node 118 within the cluster, the orchestrator service 148 can allocate additional physical resources to the cluster 106, such as by allocating an additional node 118 or additional CPU and memory to an existing node 118 within the cluster 106. The orchestrator service 148 can also place the new workload onto the node 118 from which the identified pod was relocated. Thereafter, the process can proceed to completion.

Figure 10:
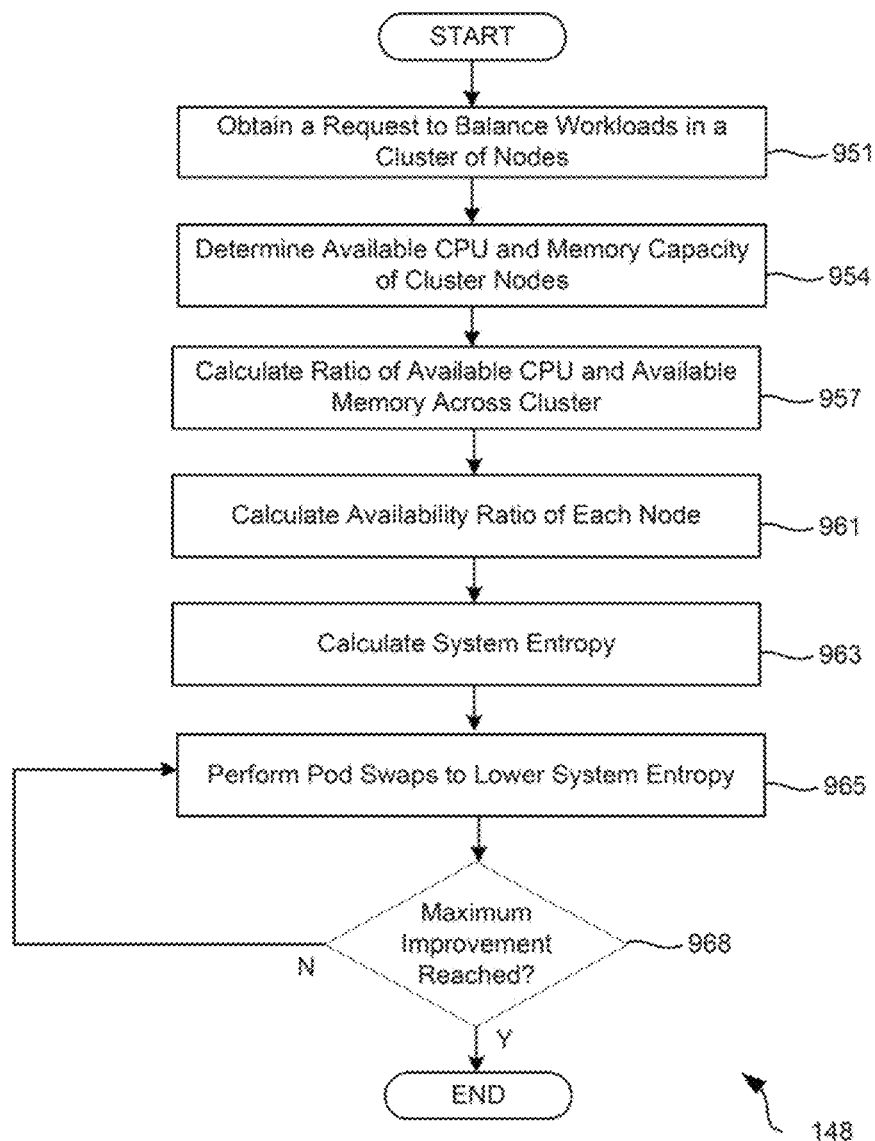
FIG. 10 is a flowchart that illustrates functionality implemented by components of the network environment of FIG. 1.

Moving on to FIG. 10, shown is a flowchart that provides one example of the operation of a portion of the orchestrator service 148. The flowchart of FIG. 10 can be viewed as depicting an example method implemented by the orchestrator service 148. The separation or segmentation of functionality as discussed herein is presented for illustrative purposes only. FIG. 10 provides an example of functionality that can be performed to balance workloads, such as pods or containers, within cluster 106 so that the available CPU and memory utilization of each node 118 are brought closer to one another.

First, at step 951, the orchestrator service 148 can obtain a request to balance workloads within a cluster 106 of nodes 118. The request can be received from an administrator. In some cases, the orchestrator service 148 can periodically initiate a balancing process to balance the execution of pods or containers within the cluster 106.

At step 954, the orchestrator service 148 can determine the available CPU and memory capacity within the cluster 106. The available CPU and memory capacity in the cluster can be calculated by aggregating the available CPU and memory capacity among the various nodes 118 within the cluster 106.

At step 957, the orchestrator service 148 can calculate a pivot ratio of the cluster 106. The pivot ratio is defined as the ratio of total available CPU capacity and total available memory capacity across all nodes 118 of the cluster 106. In an ideally balanced cluster 106, the nodes 118 of the cluster 106 should have a ratio of available CPU to memory that is equivalent to the pivot ratio. The pivot ratio can also be expressed in terms of available memory to CPU or mathematically equivalent or similar expressions.

At step 961, the orchestrator service 148 can calculate an availability ratio of each node 118 within the cluster 106. The availability ratio represents the ratio of available CPU to memory of each node 118. The available ratio can also be expressed in terms of available memory to CPU or mathematically equivalent or similar expressions.

At step 963, the orchestrator service 148 can calculate the system entropy of the cluster 106. The system entropy represents the deviation of the availability ratio of each node 118 from the pivot ratio of the cluster 106. The greater the system entropy, the more imbalanced the cluster 106.

Next, at step 965, the orchestrator service 148 can sort the nodes 118 in the cluster 106 based upon the pivot ratio and place the nodes 118 on a number line relative to the pivot ratio. The orchestrator service 148 can determine whether swapping pods or workloads, if they are on different nodes 118, would decrease the system entropy.

At step 968, the orchestrator service 148 can determine whether a maximum improvement in system entropy has been breached. The orchestrator service 148 can make this determination if there are not additional workload swaps that can be performed which decrease system entropy. If additional swaps can be performed to reduce entropy, the process can return to step 965. If no additional improvement in entropy can be made, the process proceeds to completion.

Stored in the memory device are both data and several components that are executable by the processor. Also stored in the memory can be a data store 130 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices can be used to access user interfaces generated to configure or otherwise interact with the orchestrator service 148. These client devices can include a display upon which a user interface generated by a client application for providing a virtual desktop session (or other session) can be rendered. In some examples, the user interface can be generated using user interface data provided by the computing environment 103. The client device can also include one or more input/output devices that can include, for example, a capacitive touchscreen or other type of touch input device, fingerprint reader, or keyboard.

Although the orchestrator service 148 and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system for workload placement, comprising:
at least one computing device;
at least one application executable by the at least one computing device, wherein, when executed, the at least one application causes the at least one computing device to at least:
obtain a request to place a new workload to be placed within a cluster of nodes in a computing environment, the cluster of nodes representing a plurality of physical or virtual machines in the computing environment;
determine a requested memory capacity and a requested CPU capacity associated with the new workload;
determine that none of the nodes within the cluster individually contain a sufficient memory capacity and a sufficient CPU capacity;
determine that an aggregate memory capacity and an aggregate CPU capacity of the cluster of nodes meet or exceed the requested memory capacity and the requested CPU capacity associated with the new workload;
identify at least one pod to migrate from a first node in the cluster, the at least one pod having a lower combined capacity than a combined capacity of the new workload, wherein the combined capacity comprises a combination of CPU capacity and memory capacity of the new workload and the lower combined capacity comprises a combination of CPU capacity and memory capacity of the at least one pod, wherein migrating the at least one pod frees sufficient memory capacity and sufficient CPU capacity within the first node;
add the new workload to the first node; and
migrate the at least one pod to a different node in the cluster.

2. The system of claim 1, wherein when executed, the at least one application further causes the at least one computing device to at least:
sort the nodes in the cluster based upon a placement priority, the placement priority computed based upon an amount of combined resources that need to be freed to place the new workload within a respective cluster.

3. The system of claim 2, wherein when executed, the at least one application further causes the at least one computing device to at least:
identify the first node from the cluster of nodes based upon the placement priority.

4. The system of claim 1, wherein when executed, the at least one application computes the combined capacity using a pairing function that reduces a CPU metric and a memory metric to a single value.

5. The system of claim 1, wherein the at least one pod is migrated to the different node by identifying another node within the cluster having a sufficient memory capacity and a sufficient CPU capacity.

6. The system of claim 5, wherein the at least one pod is migrated to the different node by recursively identifying another at least one pod to migrate from the different node to a third node in the cluster, the other at least one pod having a lower combined capacity than a combined capacity of the at least one pod.

7. The system of claim 1, wherein when executed, the at least one application allocates a new node to the cluster in response to a determination that the cluster of nodes fails to have sufficient aggregate memory capacity or sufficient aggregate CPU capacity.

8. A non-transitory computer-readable medium embodying executable instructions, which, when executed by a processor, cause at least one computing device to at least:
obtain a request to place a new workload to be placed within a cluster of nodes in a computing environment, the cluster of nodes representing a plurality of physical or virtual machines in the computing environment;
determine a requested memory capacity and a requested CPU capacity associated with the new workload;
determine that none of the nodes within the cluster individually contain a sufficient memory capacity and a sufficient CPU capacity;
determine that an aggregate memory capacity and an aggregate CPU capacity of the cluster of nodes meet or exceed the requested memory capacity and the requested CPU capacity associated with the new workload;
identify at least one pod to migrate from a first node in the cluster, the at least one pod having a lower combined capacity than a combined capacity of the new workload, wherein the combined capacity comprises a combination of CPU capacity and memory capacity of the new workload and the lower combined capacity comprises a combination of CPU capacity and memory capacity of the at least one pod, wherein migrating the at least one pod frees sufficient memory capacity and sufficient CPU capacity within the first node;
add the new workload to the first node; and
migrate the at least one pod to a different node in the cluster.

9. The non-transitory computer-readable medium of claim 8, wherein the executable instructions further cause the at least one computing device to at least:
sort the nodes in the cluster based upon a placement priority, the placement priority computed based upon an amount of combined resources that need to be freed to place the new workload within a respective cluster.

10. The non-transitory computer-readable medium of claim 9, wherein when executed, the executable instructions further cause the at least one computing device to at least:
identify the first node from the cluster of nodes based upon the placement priority.

11. The non-transitory computer-readable medium of claim 8, wherein when executed, the executable instructions further compute the combined capacity using a pairing function that reduces a CPU metric and a memory metric to a single value.

12. The non-transitory computer-readable medium of claim 8, wherein the at least one pod is migrated to the different node by identifying another node within the cluster having a sufficient memory capacity and a sufficient CPU capacity.

13. The non-transitory computer-readable medium of claim 12, wherein the at least one pod is migrated to the different node by recursively identifying another at least one pod to migrate from the different node to a third node in the cluster, the other at least one pod having a lower combined capacity than a combined capacity of the at least one pod.

14. The non-transitory computer-readable medium of claim 8, wherein when executed, the executable instructions further allocate a new node to the cluster in response to a determination that the cluster of nodes fails to have sufficient aggregate memory capacity or sufficient aggregate CPU capacity.

15. A computer-implemented method, comprising:
- obtaining a request to place a new workload to be placed within a cluster of nodes in a computing environment, the cluster of nodes representing a plurality of physical or virtual machines in the computing environment;
- determining a requested memory capacity and a requested CPU capacity associated with the new workload;
- determining that none of the nodes within the cluster individually contain a sufficient memory capacity and a sufficient CPU capacity;
- determining that an aggregate memory capacity and an aggregate CPU capacity of the cluster of nodes meet or exceed the requested memory capacity and the requested CPU capacity associated with the new workload;
- identifying at least one pod to migrate from a first node in the cluster, the at least one pod having a lower combined capacity than a combined capacity of the new workload, wherein the combined capacity comprises a combination of CPU capacity and memory capacity of the new workload and the lower combined capacity comprises a combination of CPU capacity and memory capacity of the at least one pod, wherein migrating the at least one pod frees sufficient memory capacity and sufficient CPU capacity within the first node;
- adding the new workload to the first node; and
- migrating the at least one pod to a different node in the cluster.

16. The computer-implemented method of claim 15, further comprising:
- sorting the nodes in the cluster based upon a placement priority, the placement priority computed based upon an amount of combined resources that need to be freed to place the new workload within a respective cluster.

17. The computer-implemented method of claim 16, further comprising:
- identifying the first node from the cluster of nodes based upon the placement priority.

18. The computer-implemented method of claim 15, further comprising:
- computing the combined capacity using a pairing function that reduces a CPU metric and a memory metric to a single value.

19. The computer-implemented method of claim 15, wherein the at least one pod is migrated to the different node by identifying another node within the cluster having a sufficient memory capacity and a sufficient CPU capacity.

20. The computer-implemented method of claim 19, wherein the at least one pod is migrated to the different node by recursively identifying another at least one pod to migrate from the different node to a third node in the cluster, the other at least one pod having a lower combined capacity than a combined capacity of the at least one pod.

* * * * *